(12) United States Patent
Payne et al.

(10) Patent No.: US 6,232,007 B1
(45) Date of Patent: May 15, 2001

(54) METAL-AIR BATTERY CONTAINER

(75) Inventors: Robert Payne, Wellesley; Gary Searle, Norfolk; Vance Rogers Shepard, Jr., Lancaster, all of MA (US)

(73) Assignee: The Gillette Company, Boston, MA (US)

( * ) Notice: Subject to any disclaimer, the term of this patent is extended or adjusted under 35 U.S.C. 154(b) by 0 days.

(21) Appl. No.: 09/374,277

(22) Filed: Aug. 13, 1999

(51) Int. Cl.$^7$ ............................................. H01M 8/04
(52) U.S. Cl. ........................ 429/27; 429/39; 429/34; 29/623.1
(58) Field of Search ............................ 429/27, 34, 38, 429/39, 28, 29; 29/623.1

(56) References Cited

U.S. PATENT DOCUMENTS

| | | |
|---|---|---|
| 2,759,038 | 8/1956 | Marsal . |
| 3,840,404 | 10/1974 | Porter et al. . |
| 4,105,830 | 8/1978 | Kordesch . |
| 4,112,198 | 9/1978 | Przybyla et al. . |
| 4,591,539 | 5/1986 | Oltman et al. . |
| 4,592,972 | 6/1986 | Juergens et al. . |
| 4,871,627 | 10/1989 | Strong et al. . |
| 4,877,694 | 10/1989 | Solomon et al. . |
| 4,950,561 | 8/1990 | Niksa et al. . |
| 5,242,763 | 9/1993 | Konishi et al. . |
| 5,328,777 | 7/1994 | Bentz et al. . |
| 5,447,805 | 9/1995 | Harats et al. . |
| 5,554,452 | 9/1996 | Delmolino et al. . |
| 5,560,999 | 10/1996 | Pedicini et al. . |
| 5,650,241 | * 7/1997 | McGee . |
| 5,663,007 | 9/1997 | Ikoma et al. . |
| 5,795,667 | 8/1998 | McKenzie et al. . |
| 5,817,435 | 10/1998 | Shimakawa et al. . |
| 5,891,589 | 4/1999 | Witizgreuter et al. . |
| 5,904,998 | 5/1999 | Dopp et al. . |
| 5,916,707 | 6/1999 | Omaru et al. . |

FOREIGN PATENT DOCUMENTS

| | | |
|---|---|---|
| 0 940 866 A2 | 3/1999 | (EP) . |
| 0 940 869 A2 | 6/1999 | (EP) . |
| 0 940 870 A2 | 9/1999 | (EP) . |
| 0 940 871 A2 | 9/1999 | (EP) . |
| 0 940 872 A2 | 9/1999 | (EP) . |
| 0 940 873 A2 | 9/1999 | (EP) . |
| 0 940 874 A2 | 9/1999 | (EP) . |
| 0 940 875 A2 | 9/1999 | (EP) . |
| 60-9070(A) | 1/1985 | (JP) . |
| 5-144482 | 6/1991 | (JP) . |
| 4-101352 | 4/1992 | (JP) . |
| 4-174977 | 6/1992 | (JP) . |
| 5-47422(A) | 2/1993 | (JP) . |
| 8-031465(A) | 2/1996 | (JP) . |
| 10-012288(A) | 1/1998 | (JP) . |
| 10-189064 | 7/1998 | (JP) . |
| 11-185835 | 9/1999 | (JP) . |

OTHER PUBLICATIONS

Cretzmeyer et al., "Commercial Zinc–Air Batteries", pp. 269–290 (No Date).
Gibbard et al., "Mechanisms of Operation of the Zinc–Air Battery", pp. 232–241 (No Date).
Espig et al., "Primary Zinc–Air Batteries", pp. 327–343 (No Date).
Bender et al., "Zinc/Air Cells", pp. 10–2–10–24 (No Date).

* cited by examiner

*Primary Examiner*—John S. Maples
(74) *Attorney, Agent, or Firm*—Fish & Richardson P.C.

(57) ABSTRACT

A metal-air battery including (a) an anode; (b) a cathode; (c) a separator between the anode and the cathode; and (d) a container having a louver is disclosed.

38 Claims, 7 Drawing Sheets

METAL-AIR BATTERY CONTAINER

BACKGROUND OF THE INVENTION

The invention generally relates to a container for a metal-air battery.

Batteries are commonly used electrical energy sources. A battery contains a negative electrode, typically called the anode, and a positive electrode, typically called the cathode. The anode contains an active material that can be oxidized; the cathode contains or consumes an active material that can be reduced. The anode active material is capable of reducing the cathode active material. In order to prevent direct reaction of the anode material and the cathode material, the anode and the cathode are electrically isolated from each other by a separator.

When a battery is used as an electrical energy source in a device, such as a cellular telephone, electrical contact is made to the anode and the cathode, allowing electrons to flow through the device and permitting the respective oxidation and reduction reactions to occur to provide electrical power. An electrolyte in contact with the anode and the cathode contains ions that flow through the separator between the electrodes to maintain charge balance throughout the battery during discharge.

In a metal-air electrochemical cell, oxygen is reduced at the cathode, and a metal is oxidized at the anode. Oxygen is supplied to the cathode from the atmospheric air external to the cell through one or more air access port(s) in the cell container.

During high rate discharge conditions, the flow of air across the cathode is not always uniform. Instead, the areas of the cathode closest to the air access ports can be overutilized, while the areas of the cathode that are farther away from the air access ports can be under-utilized. Uneven use of the cathode can lead to poor battery performance and reduced battery life.

SUMMARY OF THE INVENTION

The battery of the invention has one or more louvers that allow air to flow from the atmosphere to the cathode surface of the battery. The louvers help to distribute the air evenly to all parts of the cathode surface.

In one aspect, the invention features a metal-air battery having (a) an anode; (b) a cathode; (c) a separator between the anode and the cathode; and (d) a container having one or more louvers.

The louvers provide air flow to large portions of the cathode surface, while maintaining the structural integrity of the battery container. A battery container with louvers can be combined with a variable-thickness membrane. The portions of the membrane closer to the louver openings are thicker than the portions of the membrane farther away from the louver openings. This configuration provides for air diffusion paths of relatively uniform lengths to all portions of the cathode.

In another aspect, the invention features a process for making a metal-air battery. The process includes (a) providing one or more louver(s) in a battery container; and (b) inserting a cathode and an anode into the container.

The process allows for faster manufacturing of the battery containers. The process of cutting louvers in containers is faster than the process of punching holes into containers because no material is removed from the containers when louvers are cut. In addition, if burrs or surface discontinuities are produced from the cutting operation, they are located on portions of the can that do not contact the cathode surface.

As used herein, a "louver" means an opening or openings, having a leaf or tab, through which air can flow. When the louver is open on one side, the leaf is slanted. When the louver is open on both sides, the tab is substantially parallel to the outer surface of the container.

As used herein, a "louver opening" means the distance between the can and the edge of the leaf or tab of a louver.

As used herein, the "louver open area" means the length of the louver times the width of the louver opening, or openings in the case of louvers open on two sides.

Other features and advantages of the invention will be apparent from the description of the preferred embodiment thereof, and from the claims.

DESCRIPTION OF THE PREFERRED EMBODIMENTS

Figure 1:
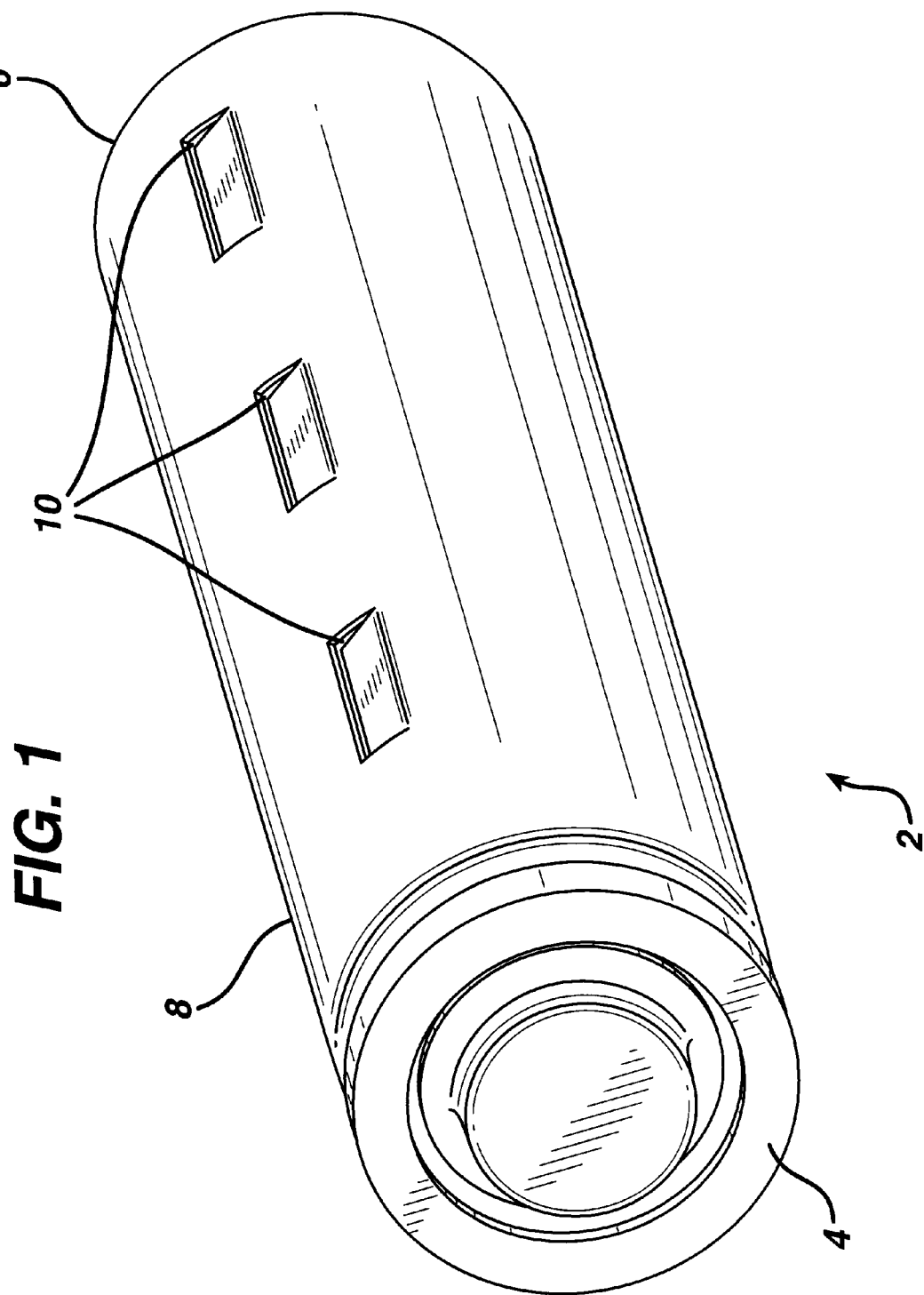
FIG. 1 is a pictorial view of a battery of the invention.

The invention features a battery with a container that has one or more louvers. Referring to FIG. 1, battery container 2 has a top 4, a bottom 6, and a side wall 8. The side wall contains three louvers 10 shown and six louvers not shown. The louvers 10 provide for good air flow from the atmosphere to the cathode surface of the battery.

The containers of the invention can be prepared, for example, as follows. Disks are cut from plates of nickel-plated cold-rolled steel. Containers of the desired shape and size (e.g., cylindrical containers for AAAA, AAA, AA, C, or D batteries) are then deep drawn from these disks.

One or more louvers is cut into each container. To cut the louvers, a tool similar to a tool that would be used to remove and produce holes of the same dimensions as the louvers is used. Three of the four cutting edges of the cutting punch are relieved so the cutting edges of the cutting punch and die do not meet. The relief allows the cut panel to remain attached to the container. Single cycle tooling can be used. For production scale manufacturing, a high speed continuous machine such as a standard metal-working press, can be used. Methods for cutting or punching louvers are described in more detail in Boeselager, Sheet Metal Punching: Collected Articles and Technical Papers (1993).

Figure 2A:
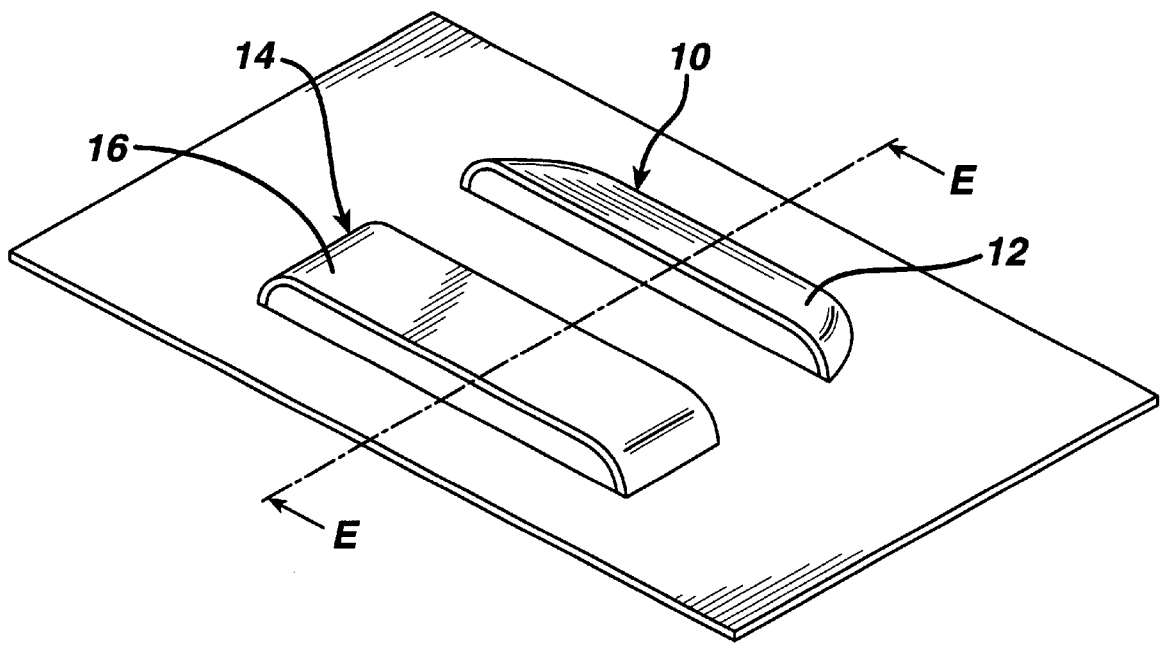
FIG. 2a is a perspective view of two louvers.
Figure 2B:
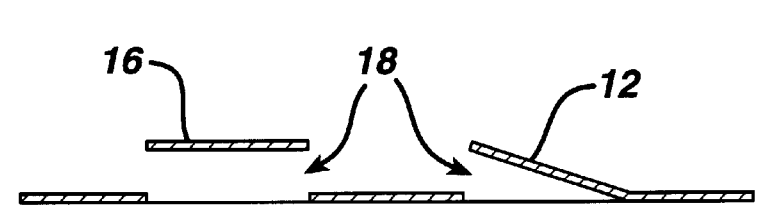
FIG. 2b is a cross-sectional view of two louvers.

Referring to FIG. 2a, a louver 10 can be open on one side; the flap of displaced material is referred to as a leaf 12. A louver 14 can also be open on both sides; when the louver is open on both sides, the section of displaced material is referred to as a tab 16. Referring to FIG. 2b, which is a view along the E—E axis, the distance between the edge of the leaf or tab and the edge of the original surface is the louver opening 18.

Figure 3A:
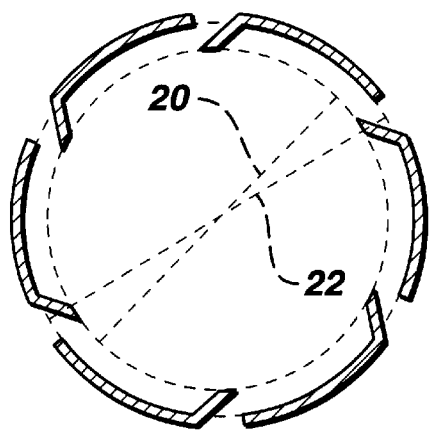
FIGS. 3a–c, 4, and 5 are cross-sectional views of battery containers.
Figure 3B:
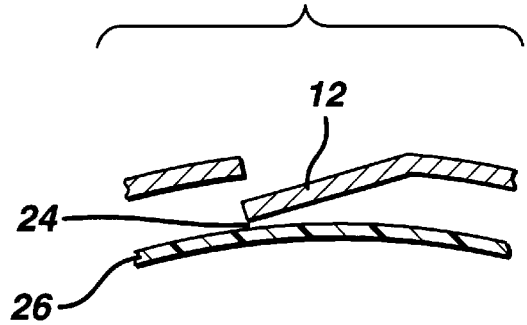
Figure 3C:
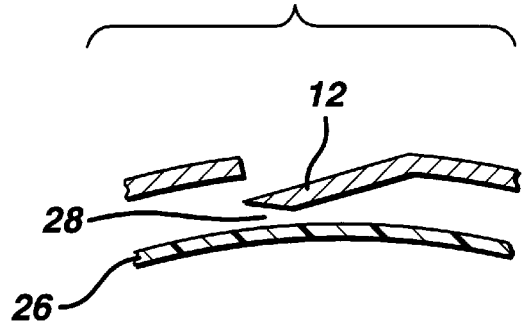

Referring to FIG. 3a, the leaves or tabs of the louvers are displaced from the original surface of the container wall and extend into the interior of the container. The edges of the displaced louver leaves or tabs define a diameter 20, referred to as the displaced diameter of the can, which is smaller than the inner diameter 22 of the can. The displaced diameter determines, in part, the size of the cathode used and the volume of anode gel that can be used. To allow for a larger cathode and more anode gel to be used, the edges of the louver leaves can be shaved off to increase the displaced diameter of the can. As shown in FIG. 3b, the distance 24 between the edge of the leaf and the membrane 26 is relatively small when the edge of the leaf is left blunt. As shown in FIG. 3c, when the edge is removed, for example, by reaming, milling, or by another metal removal process, the distance 28 between the edge of the leaf and the membrane 26 is larger. The displaced diameter can therefore be increased by removing the blunt edges of the louver leaves.

The ratio of the displaced diameter 20 to the inner diameter 22 of the can may be, for example, at least 50%, 60%, 70%, 80%, 90%, or at least 95%. As an illustration, the inner diameter of a container with a wall thickness of 0.20 mm can be 9.68 mm. The displaced diameter before reaming can be 9.02 mm, and after reaming can be 9.37 mm. In the finished container, the ratio of the displaced diameter to the inner diameter is therefore 97%. For a 0.13 mm thick can, the container ID can be 9.83 mm, and the displaced diameter after reaming can be 9.53 mm. In this can, the ratio of the displaced diameter to the inner diameter is 97%.

Figure 4:
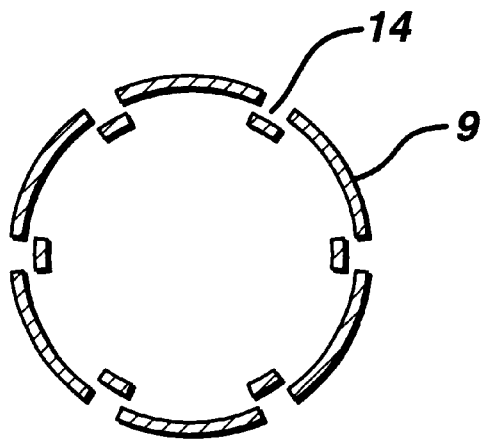

To provide for maximum air diffusion, the louvers 14 are open, or cut, on both sides, as shown in FIG. 4. Each louver provides two openings in container wall 9 through which air can flow. In this configuration, air flow may be restricted to the portion of the cathode tube that is in direct contact with the tab of the louver.

Figure 5:
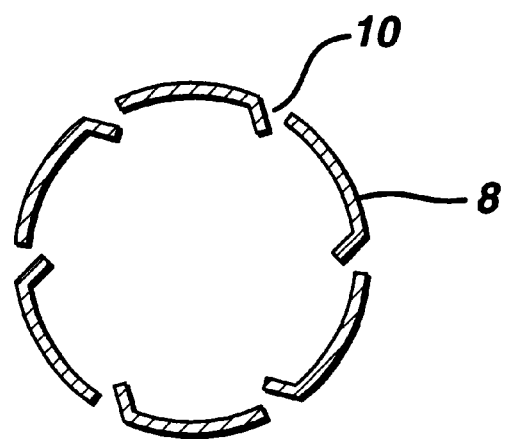

To preserve greater structural integrity, the louvers 10 may be open only on one side, as shown in FIG. 5. The other side remains attached to the container wall 8. Single cut louvers provide less open area for air access than double cut louvers.

Figure 6:
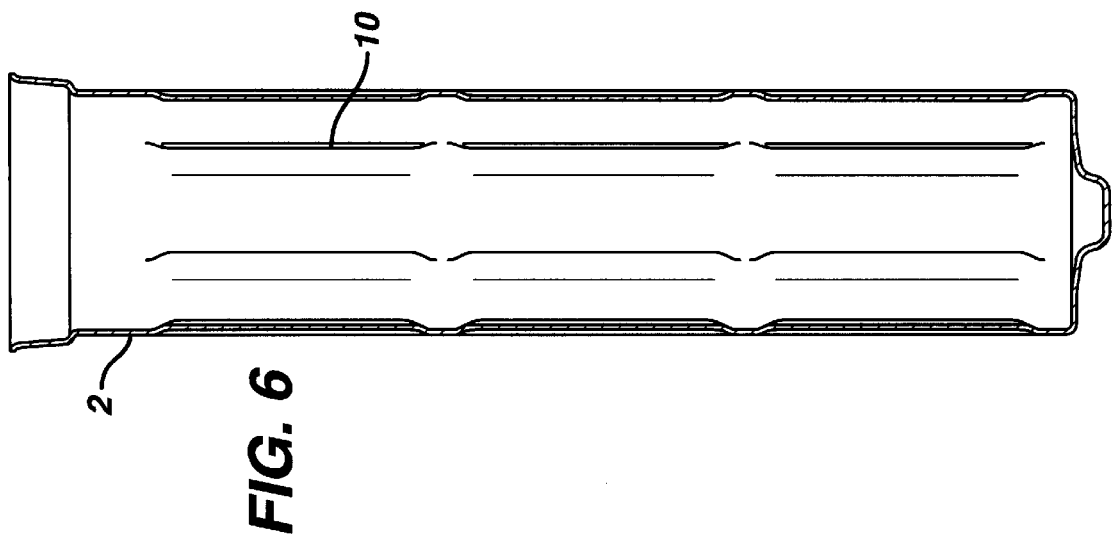

Referring to FIG. 6, the louvers 10 are oriented axially about the battery container 2. The louvers are spaced apart equally at 60 degree increments around the circumference of the container. To maintain the integrity of the container, the cut is not continuous. Instead, three cuts are made at each axial location. Multiple cuts can be made using a single punch and die by removing portions of the cutting surface of the metalworking punch.

The resulting container has three separate louvers at each axial position. Each row of louvers is composed of three segments in line from the top to the bottom of the cell. The length of each louver can be, e.g., about 2 mm to about 50 mm, and is preferably about 5 mm to about 25 mm or about 5 mm to about 15 mm. For a typical AAA cell, each louver is about 10 mm in length. The louver opening can be, e.g., 0.01 mm to about 2.0 mm, and is preferably about 0.05 mm to about 1.0 mm or about 0.1 mm to about 0.5 mm. For a typical AAA cell designed for cellular phone packs, the louver opening is about 0.125 mm. For low rate applications, the louver opening can be smaller.

The louvers are spaced about 3 mm from the top and bottom of the can and about 1–2 mm apart from each other in the longitudinal direction. The louvers are open on one side to help preserve structural integrity. The ratio of the length of the louver to the louver opening can be from about 500:1 to about 2:1. Preferably, the ratio is from about 200:1 to about 25:1 or about 100:1 to about 50:1. For a typical AAA cell, the ratio is about 80:1.

The louver open area is determined by multiplying the length of the louver times the louver opening. In the case of louvers that are open on two sides, the louver open area is the sum of the area of the two openings. Each louver open area can be, for example, at least 0.5 mm$^2$, at least 1.0 mm$^2$ or at least 2.0 mm$^2$. For a typical AAA cell for high rate applications, the louver open area is 1.26 mm$^2$. A typical AAA cell can have 18 louvers, so the sum of the louver open areas is 22.68 mm$^2$.

The ratio of the sum of these areas to the surface area of the side wall 8 of the container determines, in part, how fast the air can flow across the cathode surface. The desired rate of air flow will depend on the application for which the battery is used. The ratio of the louver open areas to the surface area of the container wall can be from about 1:1000 to about 1:10, about 1:500 to about 1:20, or about 1:100 to about 1:30.

As an example, the surface area of the wall of a AAA battery container can be 3.1416 ×10.1 mm ×44.2 mm=1402 mm$^2$. The sum of the louver open areas for a container designed for high rate applications can be about 22.68 mm$^2$. Thus, the ratio of the sum of the louver open areas to the surface area of the container wall is about 1:60. For low rate applications, the ratio can be about 1:120.

In FIG. 6, the louver openings face the same direction. In other embodiments, the direction of the louvers can be alternated segment by segment. For example, when the direction of the louvers is alternated, each row can have four louver segments. In one row, the first segment can face the clockwise direction, and the next louver in that row can face the counter clockwise direction. In the next row, the first segment can face the counter clockwise direction.

Figure 7:
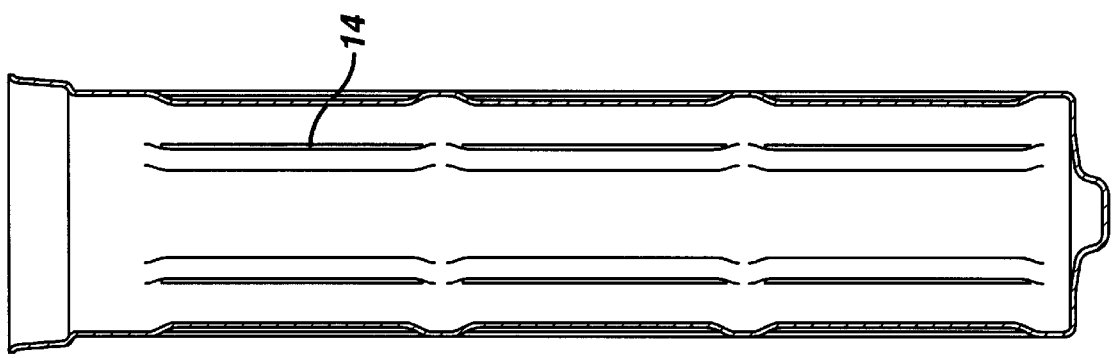

Referring to FIG. 7, six equally spaced rows of louvers 14 are cut into the battery container. Each row is composed of three louver segments in line from the top to the bottom of the cell. The louvers are open on both sides for maximum air flow.

Figure 8:
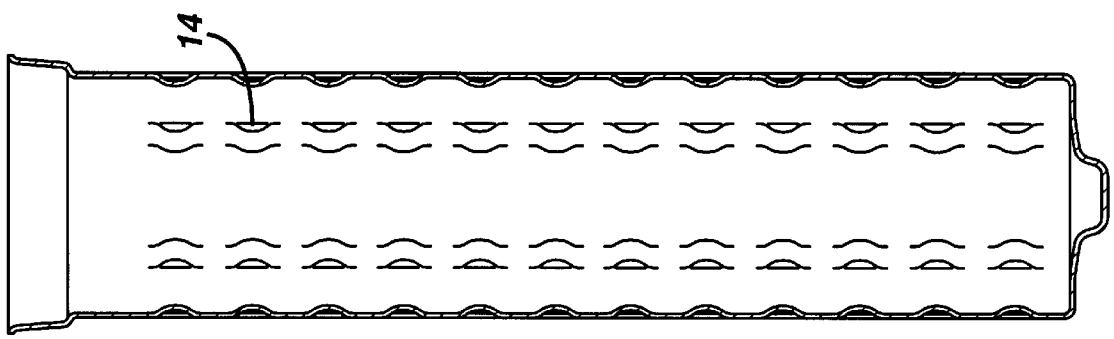
FIGS. 6, 7, and 8 are pictorial views of battery containers with louvers.

Referring to FIG. 8, six equally spaced rows of louvers 14 are cut into the battery container. Each row is composed of twelve louver segments in line from the top to the bottom of the cell. The louvers are open on both sides for maximum air flow.

The batteries of the invention are prepared as follows. A cathode tube formed from a metal mesh screen is coated with an active cathode coating mixture. The mixture is composed of a binder, carbon particles, and a catalyst for reducing peroxide, such as a manganese compound. A preferred binder includes polytetrafluoroethylene (PTFE) particles. After the cathode coating mixture has hardened, the cathode assembly is heated to remove any residual volatiles from the cathode structure.

The outside of this tube, which faces the louvers, can be covered by a PTFE membrane. The membrane helps maintain a consistent humidity level in the cell. The membrane also helps to prevent the electrolyte from leaking out of the cell and $CO_2$ from leaking into the cell.

The desired amount of air that diffuses across the cathode surface depends on the discharge rate of the application for which the battery is being used. The amount of air depends in part on the combined areas of the louver openings. It also depends on the distance between the barrier and the inner diameter of the can.

Figure 9:
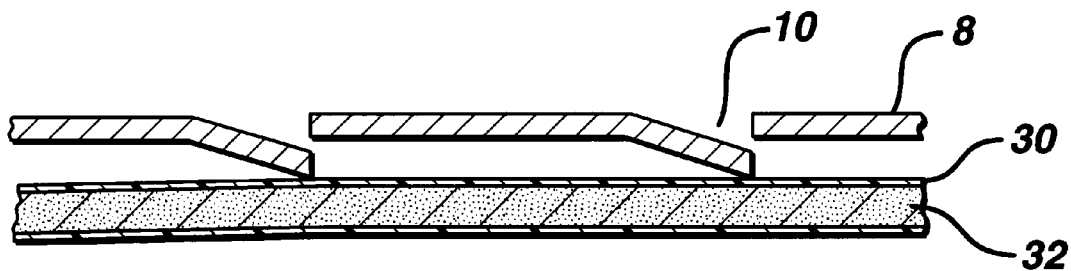
FIGS. 9 and 10 are cross-sectional views of batteries of the invention.

Referring to FIG. 9, when the PTFE membrane 30 has a uniform thickness, the portion of the cathode 32 adjacent to the opening of the louver 10 is exposed to the most air. Under high rate discharge conditions, this portion of the cathode is over-utilized, while portions of the cathode father away from the opening are under-utilized.

Figure 10:
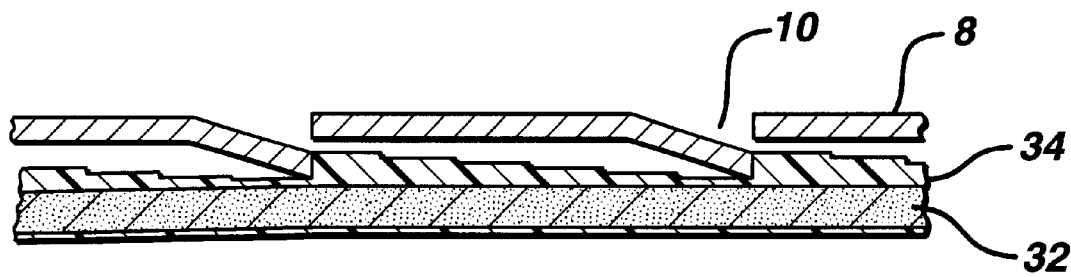

To help distribute the air flow evenly, the membrane 34 can have different thicknesses at different positions relative to the air opening. Referring to FIG. 10, the portion of the PTFE membrane 34 closest to the opening of the louver 10 is thicker than the portions that are farther from the air opening. This design helps to ensure that the diffusion path for air to any point on the cathode surface is about the same.

The variable-thickness membrane can be made, for example, by injection molding or by laminating strips of PTFE onto a sheet. Strips of gradually decreasing size are layered onto a sheet until the desired thickness at each point is achieved. The area closest to the louver has the greatest number of strips. The number of strips decreases as the distance from the louver increases.

Another way to regulate air flow is to compress different portions of the PTFE membrane incrementally. Compressing the PTFE membrane closes off the pores in the membrane and therefore restricts air flow through the membrane. The membrane can be compressed by allowing rollers to contact the sides of the cathode tube as the tube is inserted into the battery container. The cathode tube is inserted such that the portions of the membrane having the greatest degree of compression are closest to the louver openings.

To assemble the battery, the cathode tube, which is wrapped with the PTFE membrane, is placed in the container. The louvers in the container help to center the cathode tube in the air plenum. The cathode current collector must electrically contact the bottom of the container. Electrical contact may be made by providing direct physical contact between the cathode current collector and the bottom of the container, for example, by welding the current collector to the bottom of the container. Alternatively, a conductive tab can be attached to both the current collector and to the bottom of the container.

After the cathode tube is inserted and centered by the louvers, a separator is placed in the container. The separator can be a porous, electrically insulating polymer, such as polypropylene, that allows the electrolyte to contact the cathode. The inner cavity formed by the separator is then filled with anode gel.

The anode gel contains a mixture of zinc and electrolyte. The mixture of zinc and electrolyte can include a gelling agent that can help prevent leakage of the electrolyte from the cell and helps suspend the particles of zinc within the anode.

The zinc material can be a zinc powder that is alloyed with lead, indium, aluminum, or bismuth. For example, the zinc can be alloyed with between about 400 and 600 ppm (e.g., 500 ppm) of lead, between 400 and 600 ppm (e.g., 500 ppm) of indium, or between about 50 and 90 ppm (e.g., 70 ppm) aluminum. Preferably, the zinc material can include lead, indium and aluminum, lead and indium, or lead and bismuth. Alternatively, the zinc can include lead without another metal additive. The zinc material can be air blown or spun zinc. Suitable zinc particles are described, for example, in U.S. Ser. No. 09/156,915, filed Sep. 18, 1998, U.S. Ser. No. 08/905,254, filed Aug. 1, 1997, and U.S. Ser. No. 09/115,867, filed Jul. 15, 1998, each of which is incorporated by reference in its entirety.

The particles of the zinc can be spherical or nonspherical. For example, the zinc particles can be acicular in shape (having an aspect ratio of at least two). The zinc material includes a majority of particles having sizes between 60 mesh and 325 mesh. For example, the zinc material can have the following particle size distribution:

0–3 wt % on 60 mesh screen;
40–60 on 100 mesh screen;
30–50 wt % on 200 mesh screen;
0–3 wt % on 325 mesh screen; and
0–0.5 wt % on pan.

Suitable zinc materials include zinc available from Union Miniere (Overpelt, Belgium), Duracell (USA), Noranda (USA), Grillo (Germany), or Toho Zinc (Japan).

The gelling agent is an absorbent polyacrylate. The absorbent polyacrylate has an absorbency envelope of less than about 30 grams of saline per gram of gelling agent, measured as described in U.S. Pat. No. 4,541,871, incorporated herein by reference. The anode gel includes less than 1 percent of the gelling agent by dry weight of zinc in the anode mixture. Preferably the gelling agent content is between about 0.2 and 0.8 percent by weight, more preferably between about 0.3 and 0.6 percent by weight, and most preferably about 0.33 percent by weight. The absorbent polyacrylate can be a sodium polyacrylate made by suspension polymerization. Suitable sodium polyacrylates have an average particle size between about 105 and 180 microns and a pH of about 7.5. Suitable gelling agents are described, for example, in U.S. Pat. No. 4,541,871, U.S. Pat. No. 4,590,227, or U.S. Pat. No. 4,507,438.

In certain embodiments, the anode gel can include a non-ionic surfactant. The surfactant can be a non-ionic phosphate surfactant, such as a non-ionic alkyl phosphate or a non-ionic aryl phosphate (e.g., RA600 or RM510, available from Rohm & Haas) coated on a zinc surface. The anode gel can include between about 20 and 100 ppm of the surfactant coated onto the surface of the zinc material. The surfactant can serve as a gassing inhibitor.

The electrolyte can be an aqueous solution of potassium hydroxide. The electrolyte can include between about 30 and 40 percent, preferably between 35 and 40 of potassium hydroxide. The electrolyte can also include between about 1 and 2 percent of zinc oxide.

After the anode gel has been inserted into the container, a pre-assembled top assembly is placed on the top of the container. The upper external periphery (i.e., the lip) of the container is then swaged down over the pre-assembled top assembly to seal the top assembly at the top of the container.

The methods described above can also be used to prepare metal-air batteries having shapes other than cylindrical shapes. For example, the methods can be used to prepare prismatic metal-air cells with louvers.

Figure 11A:
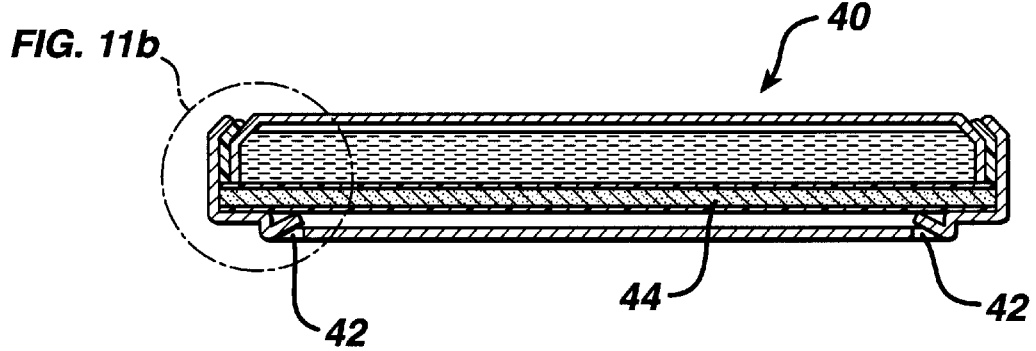
FIGS. 11a–c are cross-sectional views of prismatic cells with louvers.
Figure 11B:
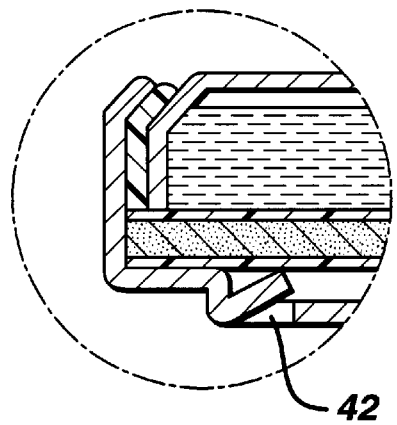
Figure 11C:
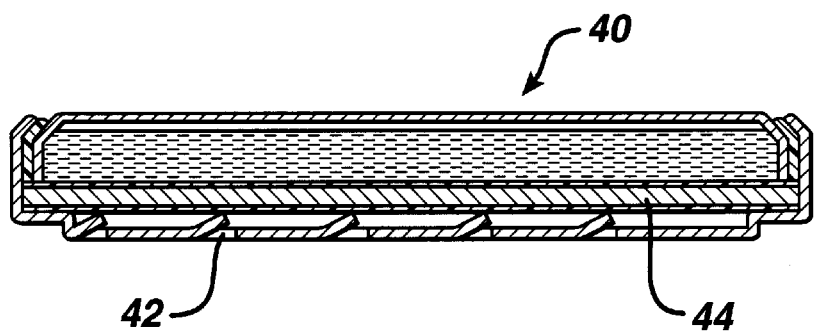

Referring to FIG. 11a, a prismatic cell 40 includes two louvers 42. Air is directed into one louver, across the cathode 44, then out the other louver. FIG. 11b shows an expanded view of a louver 42. Referring to FIG. 11c, a prismatic cell has five louvers 42. The louvers help to direct air across the cathode 44.

In plastic prismatic battery containers, the louvers are and the container can be formed in the same molding cycle. In this case, there is no savings in metal removal, but there is a benefit to using louvers in place of holes. Louver can be used to direct air flow over the cathode surface, as shown in FIG. 11a.

During storage, the battery can be covered with a removable sheet that covers the louvers. The sheet, for example, an oxygen-impermeable and hydrogen permeable sheet, restricts the flow of air between the interior and exterior of the battery. The user peels the sheet from the battery prior to use to allow oxygen from the air to enter the interior of the battery. The battery can also be stored in a sealed metal bag. The user removes the battery from the bag before use.

All publications and patents mentioned in this application are herein incorporated by reference to the same extent as if each individual publication or patent was specifically and individually indicated to be incorporated by reference.

Other embodiments are within the scope of the following claims.

What is claimed is:

1. A metal-air battery comprising:
   (a) an anode;
   (b) a cathode;
   (c) a separator between the anode and the cathode; and
   (d) a container with a wall having a louver in said wall.

2. The metal-air battery of claim 1, wherein the container has a plurality of louvers.

3. The metal-air battery of claim 2, wherein each of the louvers is open on one side.

4. The metal-air battery of claim 2, wherein each of the louvers is open on two sides.

5. The metal-air battery of claim 2, wherein the louvers are arranged in rows spaced evenly around the circumference of the container.

6. The metal-air battery of claim 5, wherein the louvers are arranged in six rows spaced evenly around the circumference of the container.

7. The metal-air battery of claim 6, wherein each of the rows has three louvers.

8. The metal-air battery of claim 6, wherein each of the rows has twelve louvers.

9. The metal-air battery of claim 2, wherein each of the louvers has a length of about 2 mm to about 50 mm.

10. The metal-air battery of claim 9, wherein each of the louvers has a length of about 5 mm to about 25 mm.

11. The metal-air battery of claim 10, wherein each of the louvers has a length of about 5 mm to about 15 mm.

12. The metal-air battery of claim 2, wherein each of the louvers has a louver opening of about 0.01 mm to about 2.0 mm.

13. The metal-air battery of claim 12, wherein each of the louvers has a louver opening of about 0.05 mm to about 1.0 mm.

14. The metal-air battery of claim 13, wherein each of the louvers has a louver opening of about 0.1 mm to about 0.5 mm.

15. The metal-air battery of claim 12, wherein for each louver the ratio of the length of the louver to the louver opening is about 500:1 to about 2:1.

16. The metal-air battery of claim 15, wherein for each louver the ratio of the length of the louver to the louver opening is about 200:1 to about 25:1.

17. The metal-air battery of claim 16, wherein for each louver the ratio of the length of the louver to the louver opening is about 100:1 to about 50:1.

18. The metal-air battery of claim 2, wherein each of the louvers has a louver open area of at least 0.5 mm$^2$.

19. The metal-air battery of claim 18, wherein each of the louvers has a louver open area of at least 1.0 mm$^2$.

20. The metal-air battery of claim 19, wherein each of the louvers has a louver open area of at least 2.0mm$^2$.

21. The metal-air battery of claim 18, wherein the ratio of the sum of the louver open areas to the surface area of the container wall is about 1:1000 to about 1:10.

22. The metal-air battery of claim 21, wherein the ratio of the sum of the louver open areas to the surface area of the container wall is about 1:500 to about 1:20.

23. The metal-air battery of claim 22, wherein the ratio of the sum of the louver open areas to the surface area of the container wall is about 1:100 to about 1:30.

24. The metal-air battery of claim 1, wherein the battery further comprises a membrane adjacent to the cathode.

25. The metal-air battery of claim 24, wherein a portion of the membrane closer to a louver opening is thicker than a portion of the membrane farther away from the louver opening.

26. The metal-air battery of claim 1, wherein the battery is a cylindrical battery.

27. The metal-air battery of claim 26, wherein the battery is a AAAA battery.

28. The metal-air battery of claim 26, wherein the battery is a AAA battery.

29. The metal-air battery of claim 26, wherein the battery is a AA battery.

30. The metal-air battery of claim 26, wherein the battery is a C battery.

31. The metal-air battery of claim 26, wherein the battery is a D battery.

32. The metal-air battery of claim 1, wherein the battery is a prismatic battery.

33. A process for making a metal-air battery, the process comprising
   (a) providing a louver in a wall of a battery container; and
   (b) inserting a cathode and an anode into the container.

34. The process of claim 33, wherein the process comprises providing six rows of louvers in the container, wherein the rows are spaced evenly around the circumference of the container.

35. The process of claim 34, wherein each of the louvers is open on one side.

36. The process of claim 34, wherein each of the louvers is open on two sides.

37. The process of claim 34, wherein the battery is a cylindrical battery.

38. The process of claim 34, wherein the battery is a prismatic battery.

* * * * *

UNITED STATES PATENT AND TRADEMARK OFFICE
CERTIFICATE OF CORRECTION

PATENT NO. : 6,232,007 B1
DATED : May 15, 2001
INVENTOR(S) : Robert Payne, Gary M. Searle and Vance Rogers Shepard, Jr.

It is certified that error appears in the above-identified patent and that said Letters Patent is hereby corrected as shown below:

<u>Title page,</u>
Item [56], References Cited,
4,112,198 delete "9/1978" and insert -- 9/1979 --

Signed and Sealed this

Twenty-third Day of April, 2002

Attest:

*Attesting Officer*

JAMES E. ROGAN
*Director of the United States Patent and Trademark Office*